US012325241B2

(12) United States Patent
Hayashi

(10) Patent No.: US 12,325,241 B2
(45) Date of Patent: Jun. 10, 2025

(54) POUCH, CARTRIDGE, AND PRINTER

(71) Applicant: BROTHER KOGYO KABUSHIKI KAISHA, Nagoya (JP)

(72) Inventor: Hideki Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 89 days.

(21) Appl. No.: 18/191,146

(22) Filed: Mar. 28, 2023

(65) Prior Publication Data

US 2023/0311525 A1 Oct. 5, 2023

(30) Foreign Application Priority Data

Mar. 31, 2022 (JP) ................................ 2022-058636

(51) Int. Cl.
*B41J 2/175* (2006.01)

(52) U.S. Cl.
CPC .. *B41J 2/17513* (2013.01); *B41J 2002/17516* (2013.01)

(58) Field of Classification Search
CPC .................... B41J 2/17513; B41J 2002/17516
USPC ............................................................ 347/86
See application file for complete search history.

(56) References Cited

U.S. PATENT DOCUMENTS

2016/0304261 A1* 10/2016 Takano ................ B65D 75/566
2019/0001688 A1* 1/2019 Tamaki ................ B41J 2/17523

FOREIGN PATENT DOCUMENTS

JP 2018-30593 A 3/2018

* cited by examiner

*Primary Examiner* — Jason S Uhlenhake
*Assistant Examiner* — Alexander D Shenderov
(74) *Attorney, Agent, or Firm* — KENEALY VAIDYA LLP

(57) ABSTRACT

A pouch is configured to accommodate one of ink, nozzle cleaning liquid or preserving liquid and is configured to be foldable from an expanded state in which the pouch has a thickness in a first direction to a shrunk state in which the pouch has a planar shape. The pouch includes: a body portion provided with a first edge and a second edge in a second direction orthogonal to the first direction; a gusset formed at an end portion of the body portion in a third direction orthogonal to the first direction and the second direction; and a spout inserting portion formed at one end edge of the gusset in the first direction. The spout inserting portion is formed at a position shifted to the first edge with respect to a center between the first edge and the second edge in the second direction.

4 Claims, 9 Drawing Sheets

POUCH, CARTRIDGE, AND PRINTER

REFERENCE TO RELATED APPLICATIONS

This application claims priority from Japanese Patent Application No. 2022-058636 filed on Mar. 31, 2022. The entire content of the priority application is incorporated herein by reference.

BACKGROUND ART

A pouch container is hitherto known, which is provided with a surface sheet, a back surface sheet, a bottom gusset sheet, and a top gusset sheet. The surface sheet, the back surface sheet, the bottom gusset sheet, and the top gusset sheet form a filling space for the content. A lower portion of the surface sheet and a lower portion of the back surface sheet are joined with the bottom gusset sheet to form a bottom seal portion. An upper portion of the surface sheet and an upper portion of the back surface sheet are joined with the top gusset sheet to form a top edge seal portion. A spout outlet portion, which is usable to take out the content, is provided at a central portion of the upper edge seal portion at which the back surface sheet and the top gusset sheet are joined with each other.

DESCRIPTION

The pouch container is sometimes used by being inserted into a printer. In this case, the pouch container is installed into the printer in order that liquid, which is accommodated in the pouch container, is supplied to the printer. The spout outlet portion is disposed at the central portion of the upper edge seal of the back surface sheet. On this account, a user inserts the pouch container into the printer while misunderstanding the front and the back in relation to the positions of the surface sheet and the back surface sheet in some cases. In such a situation, for example, the spout outlet portion cannot be connected to a connecting portion of the printer. There is such a possibility that the liquid cannot be supplied from the pouch container to the printer.

An object of the present disclosure is to provide a pouch, a cartridge, and a printer which make it possible to suppress such a situation that the pouch is installed to the printer while misunderstanding the direction of the pouch.

According to a first aspect of the present disclosure, there is provided a pouch configured to accommodate one of ink, nozzle cleaning liquid or preserving liquid and configured to be foldable from an expanded state in which the pouch has a thickness in a first direction to a shrunk state in which the pouch has a planar shape, the pouch including: a body portion provided with a first edge and a second edge in a second direction orthogonal to the first direction; a gusset formed at an end portion of the body portion in a third direction orthogonal to the first direction and the second direction; and a spout inserting portion formed at one end edge of the gusset in the first direction, wherein the spout inserting portion is formed at a position shifted to the first edge with respect to a center between the first edge and the second edge in the second direction.

The spout inserting portion is formed at the position shifted to the first edge. Accordingly, when a user installs the pouch to the printer, the user can easily understand the correct direction of the pouch. On this account, the user can reduce such a possibility that the pouch may be installed to the printer while making an error for the direction of the pouch.

The pouch according to the present disclosure may further include a spout inserted into the spout inserting portion. As for a cartridge, it is possible to reduce such a possibility that a user may install the pouch while misunderstanding the direction of the pouch, and the ink, the nozzle cleaning liquid, or the preserving liquid cannot be supplied from the pouch to the printer.

According to a second aspect of the present disclosure, there is provided a cartridge configured to accommodate the pouch according to the first aspect. When the user installs the cartridge and the pouch to the printer, the user can reduce such a possibility that the cartridge and the pouch may be installed to the printer while making an error for the direction of the pouch.

According to a third aspect of the present disclosure, there is provided a printer to which the cartridge according to the second aspect is installable. When the user installs the cartridge and the pouch to the printer, the user can reduce such a possibility that the cartridge and the pouch may be installed to the printer while making an error for the direction of the pouch.

A printer 1 according to an embodiment of the present disclosure will be successively explained with reference to the drawings. The referred drawings are used in order to explain the technical feature which can be adopted by the present disclosure. It is not intended that the configuration of the described apparatus or the like limits the present disclosure only thereto. Such configuration is merely an example for the explanation. In the explanation of the embodiment of the present disclosure, the lower-left side, the upper-right side, the lower-right side, the upper-left side, the upper side, and the lower side depicted in FIG. 1 are defined as the front side, the rear side, right side, the left side, the upper side, and the lower side of the printer 1 respectively.

Figure 1:
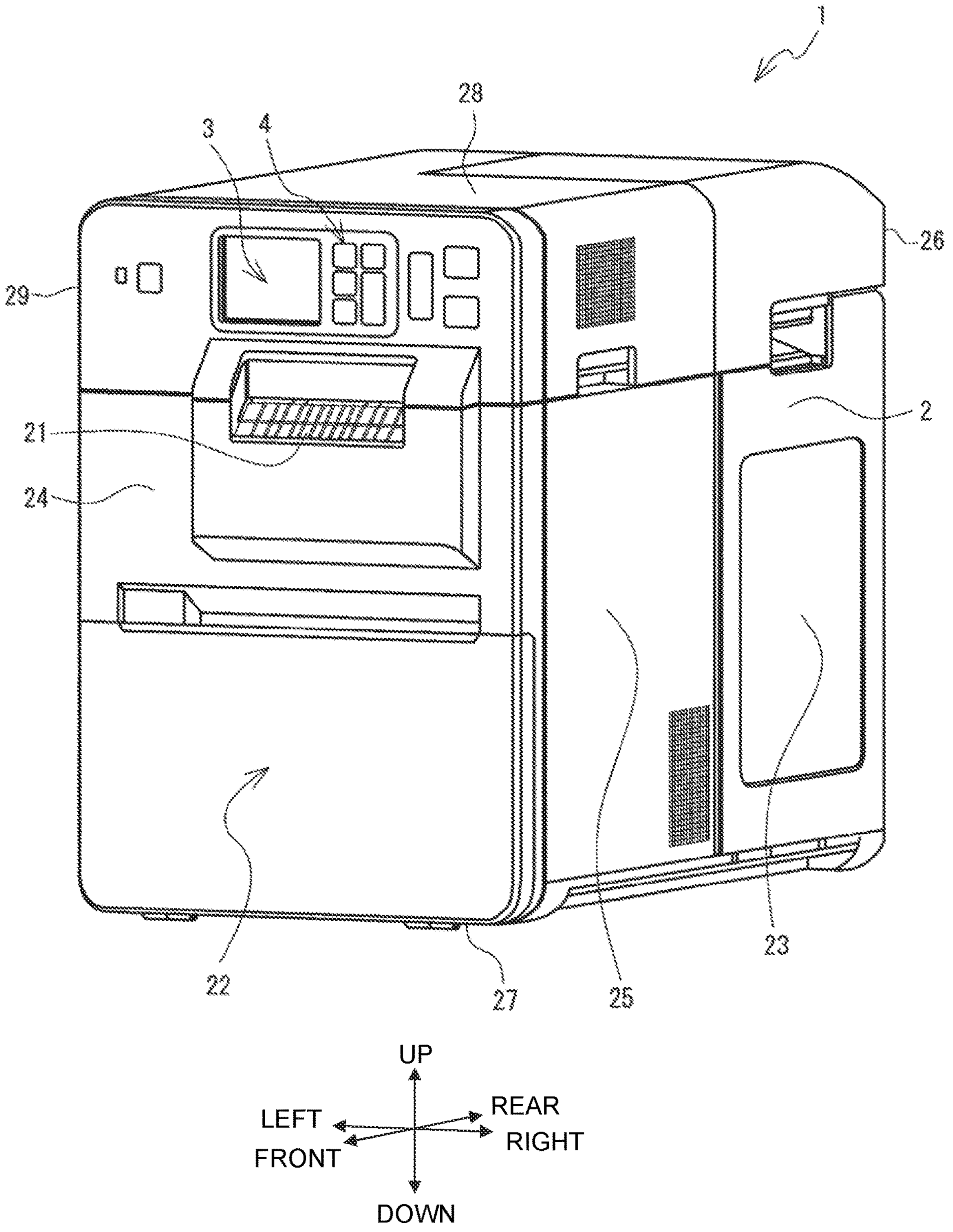
FIG. 1 is a perspective view of a printer.
Figure 2:
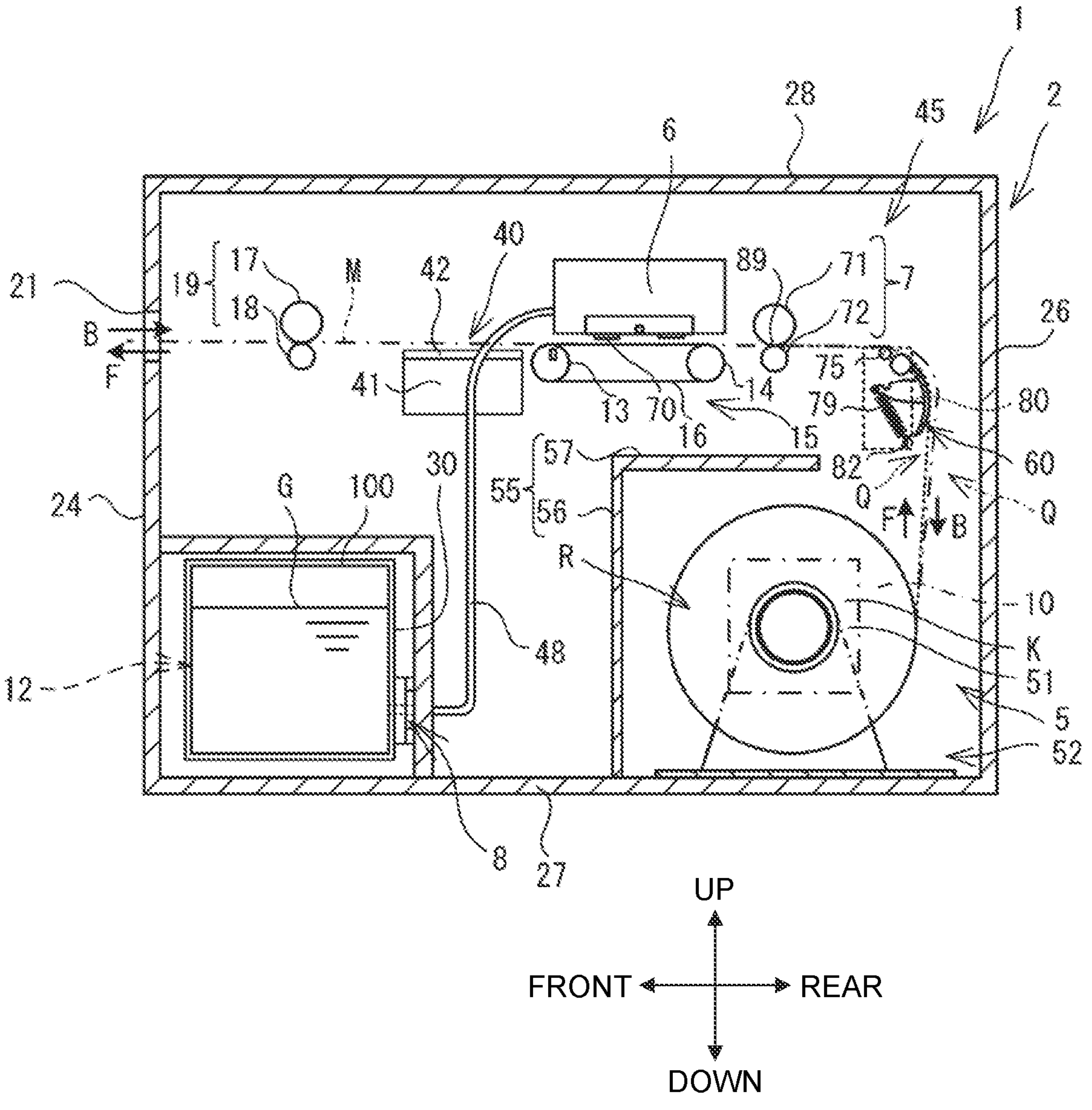
FIG. 2 is a sectional view illustrative of an internal structure of the printer.

The schematic configuration of the printer 1 will be explains with reference to FIGS. 1 and 2. The printer 1 is an ink-jet printer which performs the printing on a lengthy medium M. The medium M has a lengthy shape which is wound in a roll form around a cylindrical paper tube K. When a desired printing image is inputted by a user, the printer 1 executes the printing of the printing image. The printer 1 is provided with a casing 2, a display unit 3, and an operation unit 4.

The casing 2 has a front wall 24, a right wall 25, a rear wall 26, a left wall 29, a lower wall 27, an upper wall 28, and covers 22, 23. The casing 2 has a rectangular parallelepiped shape having a size capable of being placed on a table or desk. The casing 2 is formed with a discharge port 21. The discharge port 21 is formed on the front wall 24 of the casing 2 so that the discharge port 21 has a rectangular shape which is long in the left-right direction as viewed in a front view.

The cover 22 is a plate having a rectangular shape as viewed in a front view. The cover 22 is installed to a lower end portion on the front surface of the printer 1. The cover 22 is rotatable to a closed position at which an opening 11 (see FIGS. 3 and 4) is closed and an open position at which the opening 11 is open.

The cover 23 is a plate having a rectangular shape as viewed in a right side view. The cover 23 is rotatably supported at a rear lower portion of the right side surface of the casing 2. The cover 23 is rotatable to a closed position at which an opening is closed and an open position at which the opening is open.

The display unit 3 is provided at an upper portion of the front surface of the front wall 24 of the casing 2. The display unit 3 displays an image. The operation unit 4 is provided on the right side of the display unit 3 at the upper portion of the front surface of the front wall 24 of the casing 2. The operation unit 4 is composed of a plurality of buttons in order to input various instructions.

As depicted in FIG. 2, the printer 1 accommodates a printing unit 6, a cartridge 30, an ink tube 48, a conveying device 45, a partition wall 55, and a fixing unit 40 at the inside of the casing 2.

The printing unit 6 prints the image on the medium M supplied from a supply unit 5. The printing unit 6 is an ink-jet head. The printing unit 6 is provided with a plurality of nozzles 70 for ejecting ink Gin an ejecting direction. The printing unit 6 prints the image on the medium M by ejecting the ink G from the plurality of nozzles 70. The ejecting direction is the downward direction. The printing unit 6 is provided over or above a conveying route Q for the medium M in such a posture that the plurality of nozzles 70 are directed downwardly. The conveying route Q is the route for conveying the medium M until the medium M is discharged to the outside of the casing 2 from the discharge port 21 after the medium M is sent out from the supply unit 5.

The cartridge 30 is accommodated in an accommodating unit 12. The cartridge 30 accommodates a pouch 100, and the ink G is accommodated at the inside of the pouch 100. The cartridge 30 is installed to an installing unit 8 of the accommodating unit 12. Details will be described later on. The ink tube 48 is arranged at the inside of the casing 2. The ink tube 48 connects the installing unit 8 and the printing unit 6. The ink G, which is present at the inside of the cartridge 30, is supplied from the cartridge 30 to the printing unit 6 via the ink tube 48.

The conveying device 45 is provided with the supply unit 5, conveying units 7, 10, 15, 19, a support unit 80, a tension applying unit 60, and a rotor 75. The supply unit 5 is provided at the left of the cover 23 which is arranged at the closed position, in a space disposed at the rear lower portion of the printer 1 surrounded by the partition wall 55 and the rear wall 26. The supply unit 5 retains a roll R. The supply unit 5 is provided with a shaft portion 51 and a magazine 52. The shaft portion 51 extends in the left-right direction, and the shaft portion 51 is inserted into the paper tube K of the roll R. The magazine 52 is a support stand having a U-shaped form as viewed in a front view. The magazine 52 supports both left and right end portions of the shaft portion 51 rotatably about the axis along which the shaft portion 51 extends in the left-right direction. The shaft portion 51 is detachably supported by the magazine 52. The magazine 52 is detachably supported by the printer 1.

An operator, who exchanges the roll R, performs the exchange operation for the roll R such that the cover 23 is arranged at the open position and the magazine 52 is taken out from the inside of the casing 2.

The conveying unit 7 conveys the medium M in the conveying direction F which is directed from the supply unit 5 to the printing unit 6 and in the returning direction B which is opposite to the conveying direction F. The conveying direction F is the direction which follows the conveying route Q directed from the supply unit 5 to the printing unit 6. The conveying direction F, which is provided in the area ranging from the supply unit 5 to the tension applying unit 60, is the direction which changes depending on the remaining amount of the medium M. The conveying direction F is generally the upward direction. The conveying direction F, which is provided in the area ranging from the tension applying unit 60 to the discharge port 21, is generally the forward direction.

The conveying unit 7 is provided on the upstream side in the conveying direction F from the printing unit 6 and on the downstream side in the conveying direction with respect to the supply unit 5. That is, the conveying unit 7 is provided between the printing unit 6 and the supply unit 5 in the conveying route Q for the medium M. The conveying unit 7 has a conveying roller 71 which is rotatable about the axis extending in the left-right direction, and a pinch roller 72 which is rotatable about the axis extending in the left-right direction. The conveying unit 7 conveys the medium M while nipping the medium M in the conveying direction F directed from the supply unit 5 to the printing unit 6 by means of the conveying roller 71 and the pinch roller 72.

The conveying unit 10 is provided on the upstream side in the conveying direction F from the conveying unit 7. The conveying unit 10 conveys the medium M in the conveying direction F and the returning direction B. The conveying unit 10 rotates the roll R retained by the supply unit 5 so that the medium M is conveyed in the returning direction B to wind the medium M around the roll R. The conveying unit 10 is detachably engaged with the shaft portion 51 of the supply unit 5. The conveying unit 10 rotates the roll R retained by the supply unit 5 so that the medium M is conveyed in the conveying direction F to send out the medium M from the roll R to the printing unit 6.

The support unit 80 is provided on the upstream side in the conveying direction F from the conveying unit 7 and on the downstream side in the conveying direction F from the conveying unit 10. The support unit 80 supports the tension applying unit 60 and the rotor 75. The tension applying unit 60 is provided between the conveying unit 7 and the conveying unit 10 in the conveying route Q. The tension applying unit 60 is arranged over or above the supply unit 5. The tension applying unit 60 is supported swingably around the axis extending in the left-right direction on the upstream side in the conveying direction F from the conveying unit 7. The tension applying unit 60 abuts against the medium M to bend the medium M. Accordingly, the tension applying unit 60 applies the tension to the medium M. The tension acts in the opposite direction opposite to the advance direction of the medium M.

The rotor 75 is supported rotatably about the axis extending in the left-right direction on the upstream side in the conveying direction F from the conveying unit 7 and on the downstream side in the conveying direction F from the end portion on the downstream side in the conveying direction F of the tension applying unit 60 (i.e., the upper end portion of the tension applying unit 60).

The conveying unit 15 is provided under or below the printing unit 6 on the downstream side in the conveying direction F with respect to the conveying unit 7. The conveying unit 15 conveys the medium M in the conveying direction F. The conveying unit 15 is provided with a driving roller 13, a driven roller 14, and an endless belt 16. The driving roller 13 and the driven roller 14 are separated from each other in the front-rear direction. The endless belt 16 is applied between the driving roller 13 and the driven roller 14. The driven roller 14 is rotated in accordance with the rotation of the endless belt 16. The upper end of the outer circumferential surface of the endless belt 16 has the vertical position which is approximately the same as that of the nip point 89 at which the medium M is nipped by the conveying unit 7. The upper end is opposed to the plurality of nozzles 70 of the printing unit 6. The medium M, which is conveyed between the conveying unit 7 and the conveying unit 19, is conveyed in the conveying direction F in a state in which the medium M is attracted or sucked to the endless belt 16 by means of the static electricity or the negative pressure from the lower position, on the upper end of the outer circumferential surface of the endless belt 16.

The fixing unit 40 is arranged on the downstream side in the conveying direction with respect to the printing unit 6 and on the upstream side in the conveying direction with respect to the conveying unit 19. Further, the fixing unit 40 is provided on the lower side of the conveying route Q. The fixing unit 40 is provided with a heat source 41 which is capable of effecting the conduction heating, and a heating plate 42 which is heated by the heat source 41. The heating plate 42 supports, from the lower position, the medium M which passes through the conveying route Q. The medium M is heated by the heating plate 42, and thus the ink G, which is ejected onto the medium M by the printing unit 6, is fixed to the medium M.

The conveying unit 19 is provided on the downstream side in the conveying direction with respect to the printing unit 6 and the fixing unit 40 and on the upstream side in the conveying direction with respect to the discharge port 21. The conveying unit 19 conveys the medium M in the conveying direction F and the returning direction B. The conveying unit 19 has a conveying roller 17 which is rotatable about the center of the axis extending in the left-right direction, and a pinch roller 18. The conveying unit 19 conveys the medium M while nipping the medium M by vertically interposing the medium M by means of the conveying roller 17 and the pinch roller 18.

When the printing process is executed, the controller of the printer 1 drives the conveying units 7, 10, 15, 19 to convey the medium M. The printer 1 adjusts the driving amounts of the conveying units 7, 10 so that the tension is applied to the medium M by the tension applying unit 60. The controller of the printer 1 drives the printing unit 6 in synchronization with the conveyance of the medium M so that the ink G, which is supplied from the cartridge 30 via the ink tube 48, is ejected to the medium M. The controller of the printer 1 drives a halogen lamp 41 to fix the ink G on the medium M to the medium M. The medium M is discharged from the discharge port 21 to the outside of the casing 2.

Figure 3:
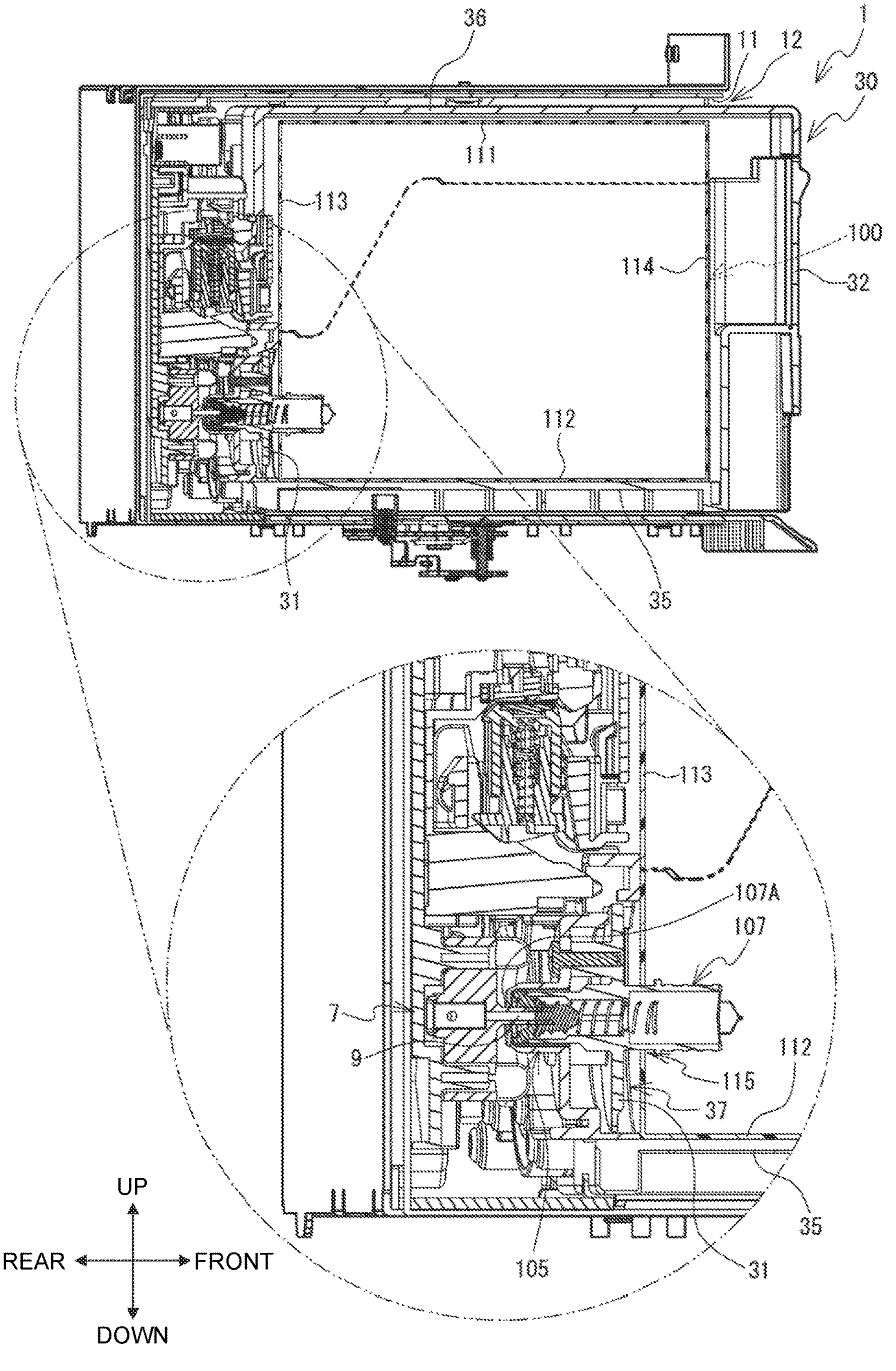
FIG. 3 is a sectional view of the interior of an accommodating unit which accommodates a cartridge installed with a pouch.
Figure 4:
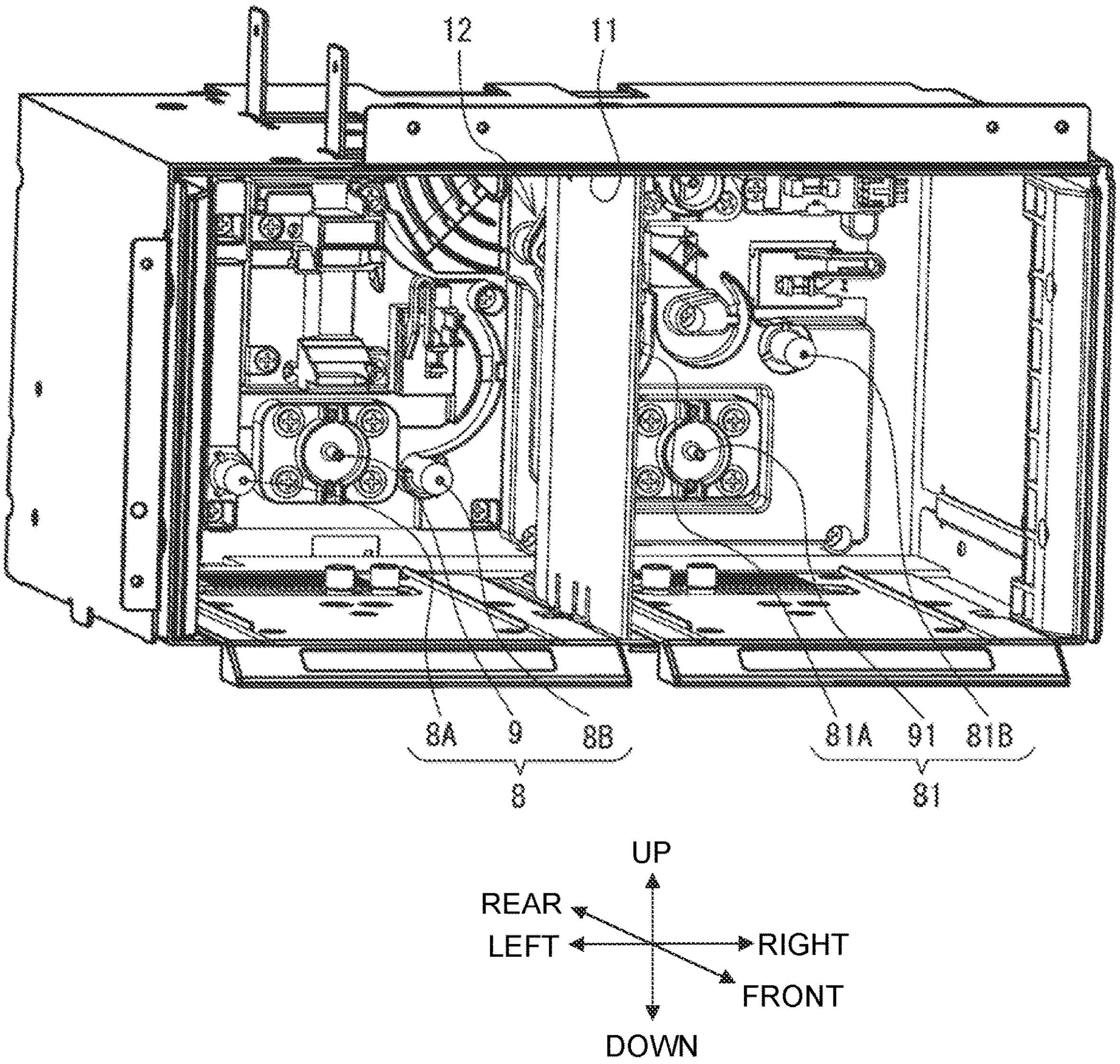
FIG. 4 is a perspective view of the accommodating unit.

The accommodating unit 12 of the printer 1 will be explained with reference to FIGS. 3 and 4. The accommodating unit 12 is provided at the lower end portion of the printer 1. The accommodating unit 12 has a rectangular parallelepiped shape extending in the left-right direction. The accommodating unit 12 is provided with an opening 11 which is open in the forward direction. When the cover 22 is changed from the closed state to the open state, the opening 11 of the accommodating unit 12 is exposed.

The cartridge 30 is accommodated on the left side of the accommodating unit 12. The cartridge 30 is installed to the installing unit 8 in a state in which the cartridge 30 is accommodated in the accommodating unit 12 of the printer 1.

The installing unit 8 is provided at the rear end portion on the lower side of the accommodating unit 12. The installing unit 8 is provided with two positioning bosses 8A, 8B and a needle 9. When the cartridge 30 is accommodated in the accommodating unit 12, the two positioning bosses 8A, 8B of the installing unit 8 are engaged respectively with two positioning holes 105B, 105A (see FIG. 5) of an engaging unit 105 of the pouch 100 which accommodates the liquid such as the ink G or the like. In accordance with this engagement, the cartridge 30 is positioned in the printer 1.

The needle 9 is provided at the central portion between the positioning bosses 8A, 8B. The interior of the needle 9 is hollow. When the cartridge 30 is accommodated in the accommodating unit 12, the needle 9 is inserted into a supply hole 107A of the spout 107 of the pouch 100. Accordingly, the liquid such as the ink G or the like, which is accommodated in the pouch 100, can be supplied to the ink-jet head of the printer 1 via the ink tube 48.

On the other hand, a maintenance box is accommodated on the right side of the accommodating unit 12. The maintenance box has a rectangular parallelepiped shape in the same manner as the cartridge 30. The maintenance box is installed to the installing unit 81 of the accommodating unit 12. The installing unit 81 is provided with positioning bosses 81A, 81B and a needle 91. The positioning bosses 81A, 81B are engaged with an engaging unit disposed on the front surface of the maintenance box. The needle 91 is arranged at the inside of the spout arranged on the front surface side of the maintenance box. A pouch, which accommodates a nozzle cleaning solution for the maintenance, is accommodated in the maintenance box. The nozzle cleaning solution is supplied to the cap from the maintenance box, and the nozzles 70 are immersed in the nozzle cleaning solution in the cap during the maintenance. Thus, the nozzles 70 are cleaned or washed. Note that as for the pouch which is accommodated in the maintenance box, it is assumed that the same pouch as the pouch 100 installed to the cartridge 30 is used.

Figure 5:
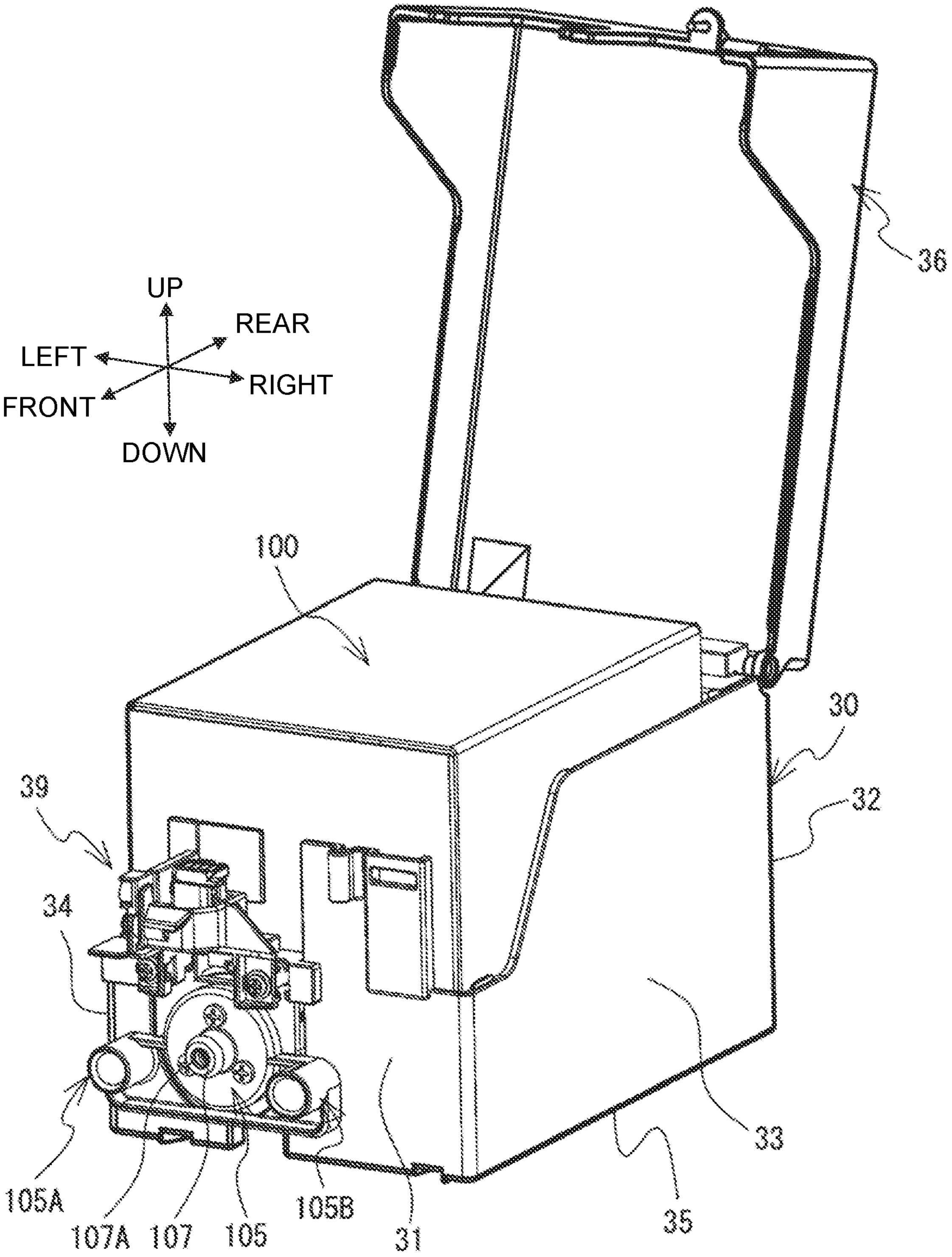
FIG. 5 is a perspective view illustrative of a state in which the pouch is installed to the cartridge.
Figure 6:
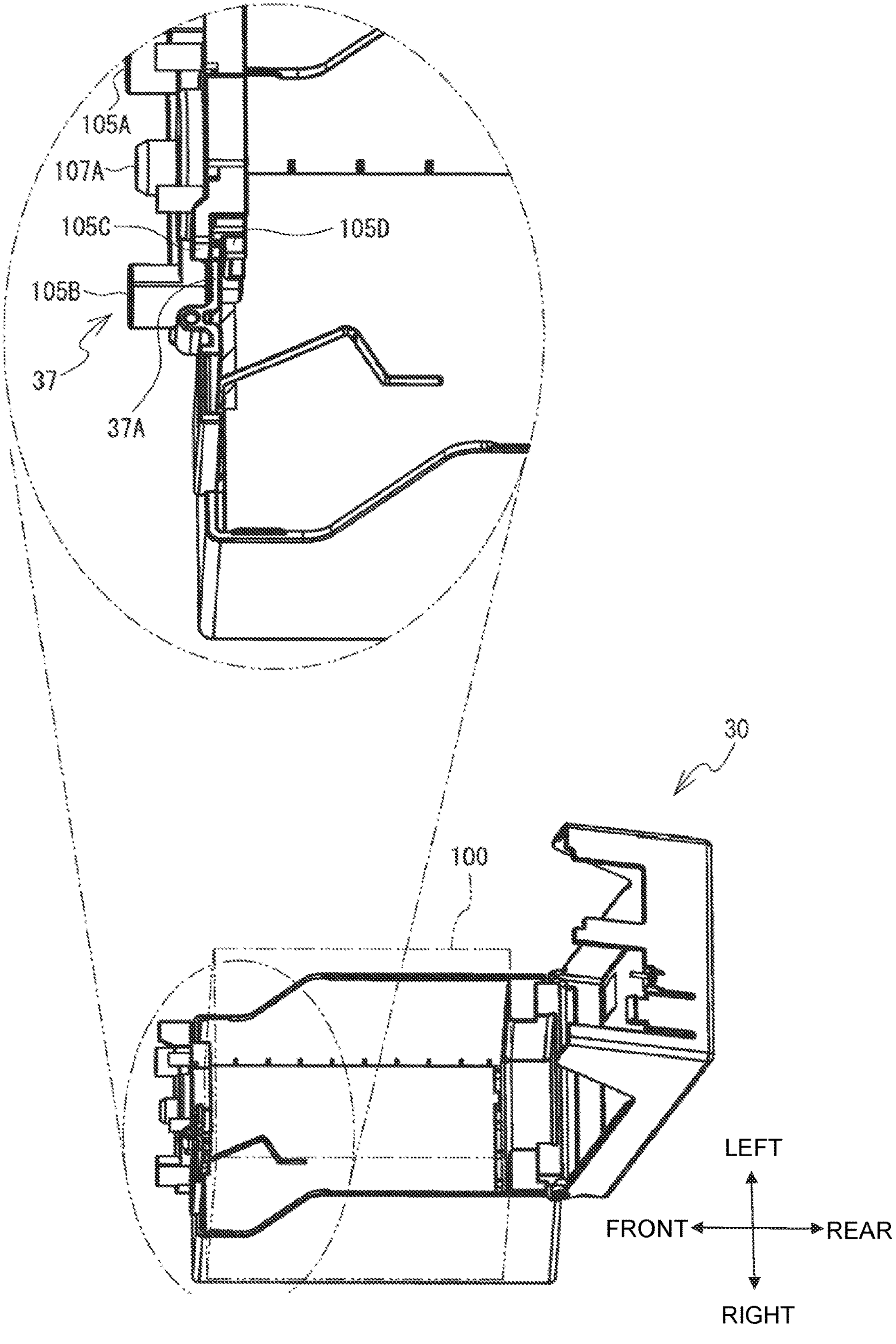
FIG. 6 is a perspective view in which a spout engaging groove of the cartridge and an engaging unit of the pouch are viewed in the upward oblique rightward direction.
Figure 7:
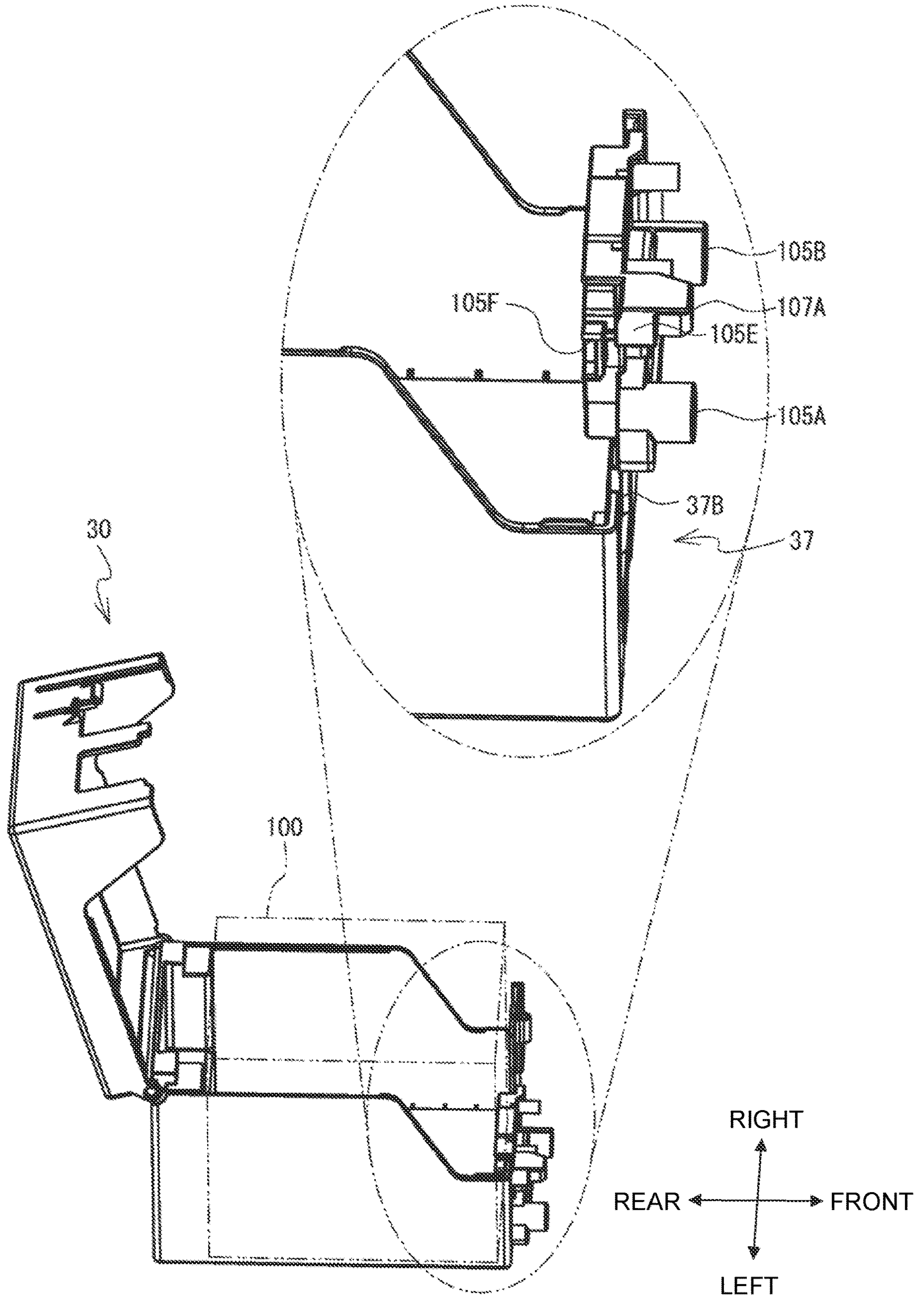
FIG. 7 is a perspective view in which the spout engaging groove of the cartridge and the engaging unit of the pouch are viewed in the upward oblique leftward direction.

The cartridge 30 will be explained with reference to FIGS. 5 to 7. In the following explanation, the lower-left side, the upper-right side, the lower-right side, the upper-left side, the upper side, and the lower side depicted in FIG. 5 are defined as the front side, the rear side, right side, the left side, the upper side, and the lower side of the cartridge 30, respectively. When the cartridge 30, in which the pouch 100 is accommodated, is installed to the printer 1, the cartridge 30 is installed so that the upward, the downward, the left, the right, the front, and the rear of each of the cartridge 30 and the pouch 100 are coincident with the upward, the downward, the right, the left, the rear, and the front of the printer 1 depicted in FIGS. 1 to 4 respectively. Further, in FIGS. 6 and 7, the pouch 100 is depicted by two-dot chain lines for the convenience of explanation.

The cartridge 30 is provided with a front plate 31, a rear plate 32, a right plate 33, a left plate 34, a bottom plate 35, and a cover 36. The cartridge 30 has a rectangular parallelepiped shape.

The front plate 31 extends upwardly from the front end of the bottom plate 35. The front plate 31 has a rectangular shape which is long in the left-right direction. A spout engaging groove 37 is provided at a lower-left portion of the front plate 31. The spout engaging groove is provided at a position shifted (deviated) to the left side from the central portion of the front plate 31 in the left-right direction. The spout engaging groove 37 penetrates through the front plate 31 in the front-rear direction, and the spout engaging groove 37 is open upwardly. The engaging unit 105 of the pouch 100 is engaged with the spout engaging groove 37 from the upper position. Specifically, the engaging unit 105 is provided with ribs 105C, 105D, 105E, 105F. Parts of the spout engaging groove 37 are composed of walls 37A, 37B. When the pouch 100 is installed to the cartridge 30, then the wall 37A is allowed to pass between the rib 105C and the rib 105D, and the wall 37B is allowed to pass between the rib 105E and the rib 105F. The wall 37A is interposed by the rib 105C and the rib 105D, and the wall 37B is interposed by the rib 105E and the rib 105F. Accordingly, the spout 107 is fixed by the cartridge 30.

The right plate 33 extends upwardly from the right end of the bottom plate 35. The front upper portion of the right plate 33 is inclined upwardly at positions disposed more rearwardly. The length in the upward-downward direction of the front end portion of the right plate 33 is substantially the same as the length in the upward-downward direction of the right end portion of the front plate 31.

The left plate 34 extends upwardly from the left end of the bottom plate 35. The length in the upward-downward direction of the front end portion of the left plate 34 is substantially the same as the length in the upward-downward direction of the left end portion of the front plate 31. The front upper portion of the left plate 34 is inclined upwardly at positions disposed more rearwardly. The lengths in the upward-downward direction on the rear side of the right plate 33 and the left plate 34 are about twice the lengths in the upward-downward direction of the front end portions of the right plate 33 and the left plate 34.

The rear plate 32 extends upwardly from the rear end of the bottom plate 35. The length in the upward-downward direction of the bottom plate 35 is equal to the lengths in the upward-downward direction on the rear side of the right plate 33 and the left plate 34. An opening 39, which is open upwardly, is formed by the bottom plate 35, the front plate 31, the right plate 33, the left plate 34, and the rear plate 32.

The cover 36 is installed openably/closably to the upper end portion of the rear plate 32. The cover 36 is rotatable to a closed state in which the opening 39 is closed and an open state in which the opening 39 is exposed. In the open state, the front end portion of the cover 36 protrudes frontwardly depending on the shapes of the front plate 31, the front end portion of the right plate 33, and the front end portion of the left plate 34. When the cover 36 is in the open state, an operator can attach/detach the pouch 100 with respect to the cartridge 30. When the cover 36 is in the closed state, the cartridge 30 can be accommodated in the accommodating unit 12 of the printer 1.

Figure 8:
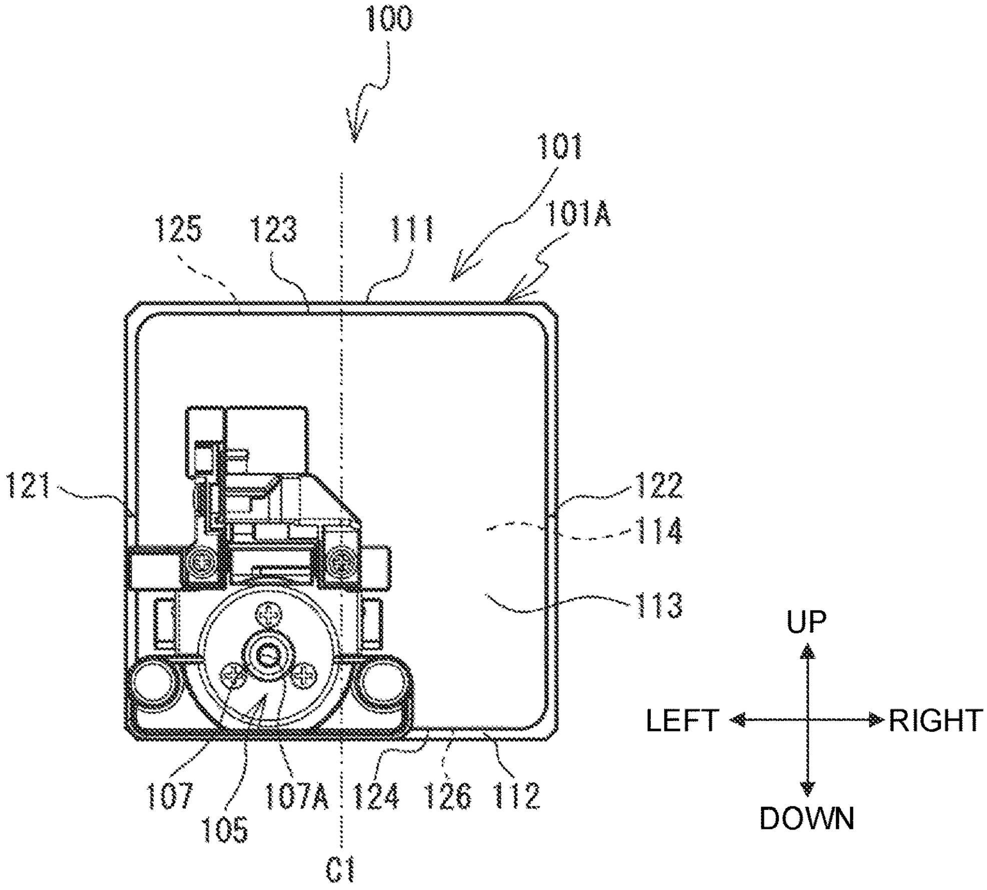
FIG. 8 is a front view in which the pouch is in an expanded state.
Figure 9:
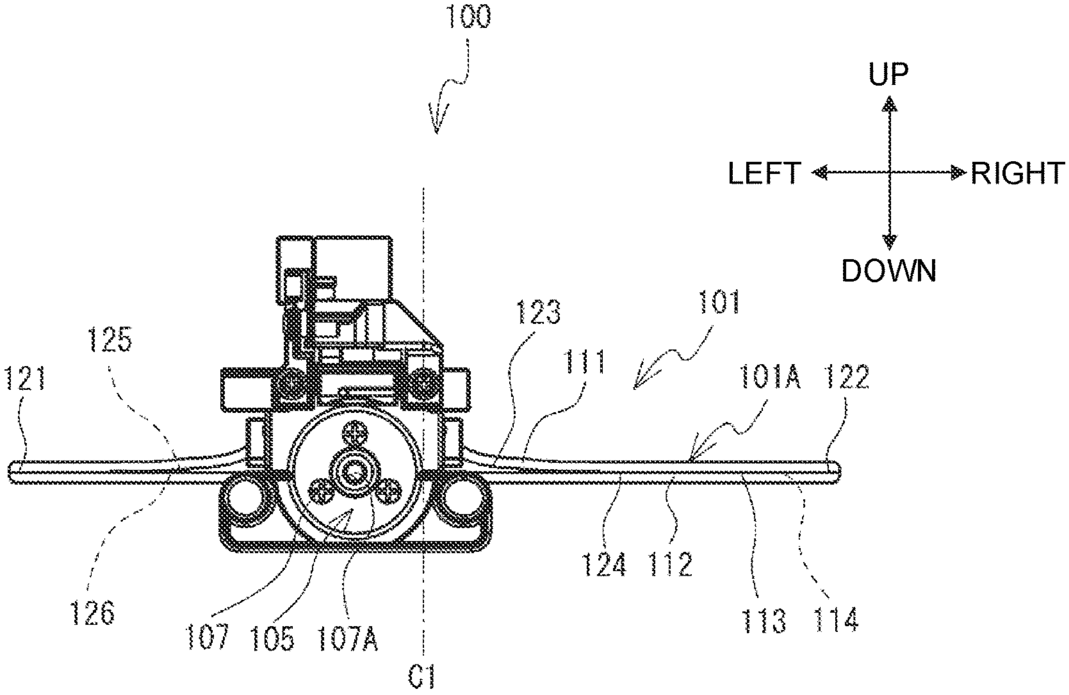
FIG. 9 is a front view in which the pouch is in a shrunk state.
Figure 10:
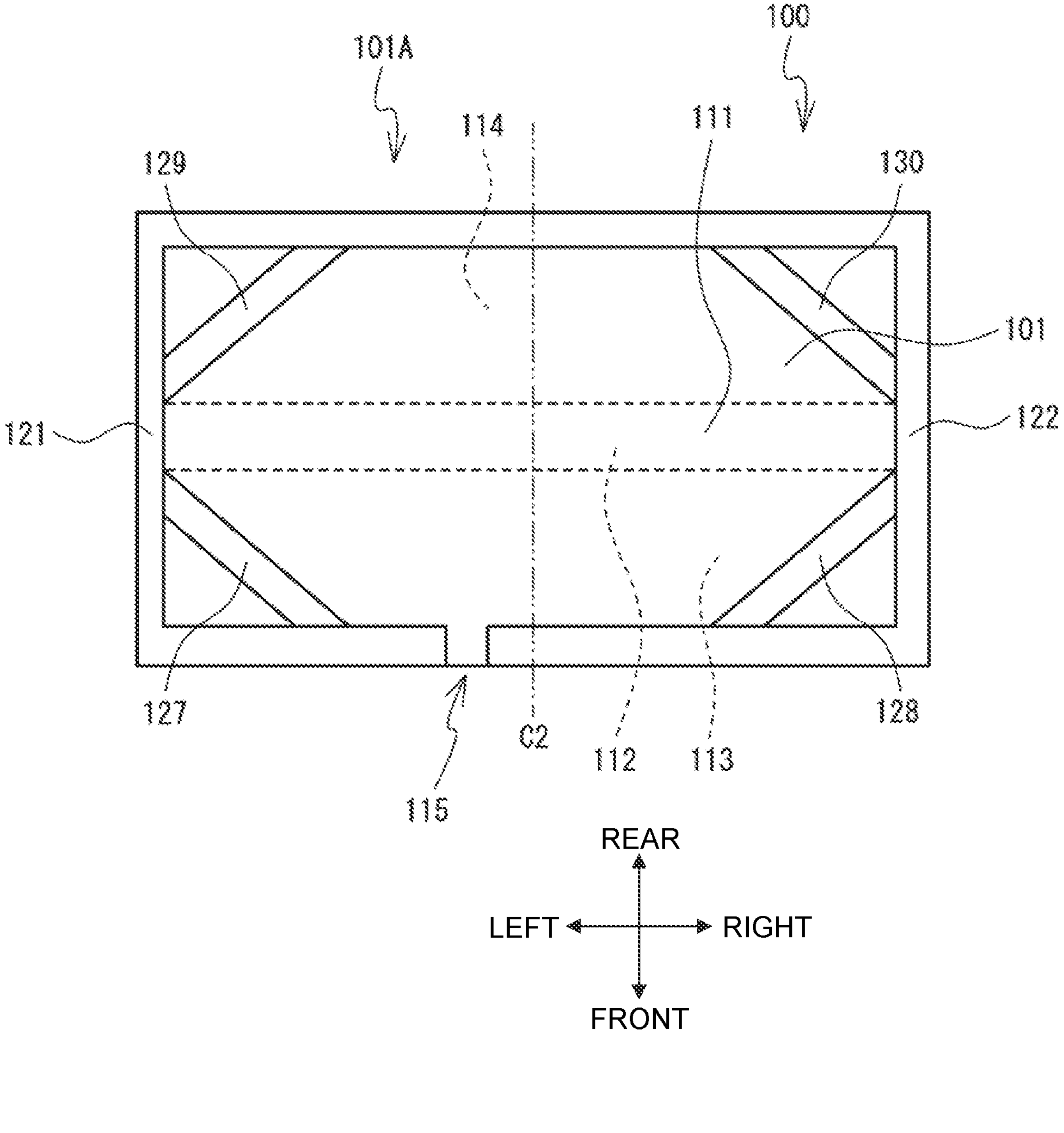
FIG. 10 is a plan view in which the pouch is in the shrunk state.

The pouch 100, which accommodates the ink G to be used for the printing, will be explained with reference to FIGS. 8 to 10. In the following explanation, the forward side, the rearward side, the right side, the left side, the upper side, and the lower side as viewed in FIGS. 8 and 9 are defined as the front side, the rear side, the right side, the left side, the upper side, and the lower side of the pouch 100 respectively. Note that the straight line C1, which is indicated by the alternate long and short dash lines in FIGS. 8 and 9, is the straight line parallel to the upward-downward direction. The straight line C1 indicates the center in the left-right direction of the pouch 100. Further, in FIG. 10, the spout 107 of the pouch 100 and the engaging unit 105 are omitted for the convenience of explanation. Note that the straight line C2, which is indicated by the two-dot chain line in FIG. 10, is the straight line parallel to the front-rear direction. The straight line C2 indicates the center in the left-right direction of the pouch 100.

The color of the ink G is, for example, white, magenta, cyan, or yellow. The pouch 100 is foldable from the expanded state (see FIG. 8) in which the pouch 100 has the thickness in the upward-downward direction to the shrunk state (see FIG. 9) which is planner. The pouch 100 is composed of a resin film. The resin film is preferably provided with the basic performance as the packaging member, including, for example, the shock resistance, the wear resistance, and the heat resistance.

The pouch 100 is provided with a bag 101, a spout 107, and an engaging unit 105. The bag 101 of the pouch 100 is formed such that one sheet made of synthetic resin is incorporated and edge portions and the like are thermally welded. The bag 101 is provided with a body portion 101A, a front gusset 113, a rear gusset 114, and a spout inserting portion 115. The body portion 101A is provided with an upper portion 111 and the lower portion 112. The upper portion 111 and the lower portion 112 have rectangular shapes which are long in the left-right direction.

The front gusset 113 is formed at the end portion in the front direction of the body portion 101A. The rear gusset 114 is formed at the end portion in the rear direction of the body portion 101A. The front gusset 113 and the rear gusset 114 are opposed to one another in the front-rear direction. When the pouch 100 is changed from the shrunk state to the expanded state, the front gusset 113 and the rear gusset 114 are spread in the planar form from the folded state. In this case, when the front gusset 113 and the rear gusset 114 are spread in the planar form, then the widths in the upward-downward direction of the front gusset 113 and the rear gusset 114 are spread, and the widths in the left-right direction thereof are narrowed in accordance with the expansion of the pouch 100. The front gusset 113 and the rear gusset 114 are folded between the upper portion 111 and the lower portion 112 in the shrunk state of the pouch 100.

The bag 101 is provided with seal portions 121 to 130 which are formed by the thermal welding described above, at the end portions thereof.

The left seal portion 121 is formed by thermally welding the end portions of the upper portion 111 and the lower portion 112 mutually at the left end portion of the body portion 101A. The right seal portion 122 is formed by thermally welding the end portions of the upper portion 111 and the lower portion 112 mutually at the right end portion of the body portion 101A.

The upper edge seal portion 123 is formed by thermally welding the front end of the upper portion 111 and the upper edge of the front gusset 113 at the front end portion of the body portion 101A. The lower edge seal portion 124 is formed by thermally welding the front end of the lower portion 112 and the lower edge of the front gusset 113 at the front end portion of the body portion 101A.

The upper edge seal portion 125 is formed by thermally welding the rear end of the upper portion 111 and the upper edge of the rear gusset 114 at the rear end portion of the body portion 101A. The lower edge seal portion 126 is formed by thermally welding the rear end of the lower portion 112 and the lower edge of the rear gusset 114 at the rear end portion of the body portion 101A.

The seal portions 127, 128, 129, 130 are formed by thermally welding four corners of the upper portion 111 and the lower portion 112. The left front seal portion 127 is formed at the left front portion of the body portion 101A. The left front seal portion 127 extends in a straight form from the left rear to the right front. The right front seal portion 128 is formed at the right front portion of the body portion 101A. The right front seal portion 128 extends in a straight form from the left front to the right rear.

The left rear seal portion 129 is formed at the left rear portion of the body portion 101A. The left rear seal portion 129 extends in a straight form from the left front to the right rear. The right rear seal portion 130 is formed at the right rear portion of the body portion 101A. The right rear seal portion 130 extends in a straight form from the left rear to the right front.

In the shrunk state of the pouch 100, the seal portions 127 to 130 are arranged obliquely with respect to the front-rear direction as depicted in FIG. 10 as viewed in a plan view. On the contrary, when the pouch 100 is in the expanded state, the seal portions 127 to 130 are arranged in the front-rear direction as viewed in a plan view.

As depicted in FIG. 10, the spout inserting portion 115 is provided at the lower left portion of the front gusset 113. In particular, the spout inserting portion 115 is provided at the position which is disposed on the left side from the center (C1, C2) in the left-right direction of the lower edge seal portion 124. In other words, the spout inserting portion 115 is formed at the position which is shifted toward the left seal portion 121 from the center (C1, C2) between the left seal portion 121 disposed at the left edge of the body portion 101A and the right seal portion 122 disposed at the right edge of the body portion 101A at the lower end portion of the front gusset 113. The spout inserting portion 115 is formed such that a part of the lower end portion of the front gusset 113 is not thermally welded. The spout inserting portion 115 makes communication between the inside and the outside of the pouch 100. The spout 107 is inserted into the spout inserting portion 115. The spout 107 is thermally welded to the bag 101. The spout 107 is a hollow member which extends in the front-rear direction. The engaging unit 105 is formed by being integrally molded with the spout 107.

An operator, who accommodates the pouch 100 in the cartridge 30, allows the cover 36 to be in the open state so that the pouch 100 in the shrunk state is accommodated from the upper position via the opening 39. In this situation, the engaging unit 105 is engaged from the upper position with respect to the spout engaging groove 37 of the cartridge 30. After that, the operator injects the liquid such as the ink G or the like into the bag 101 of the pouch 100 via the supply hole 107A. When the interior of the pouch 100 is filled with the ink G or the like, the pouch 100 is in the expanded state. Then, the operator closes the cover 36. Accordingly, the pouch 100 is accommodated in the cartridge 30.

The spout 107 is provided on the left side of the lower edge seal portion 124 of the front gusset 113, i.e., at the position shifted toward the left seal portion 121 from the center (C1, C2). Therefore, it is possible to reduce such a possibility that the operator, who installs the pouch 100 to the cartridge 30, may install the pouch 100 to the cartridge 30 while misunderstanding the direction of the pouch 100. Further, it is possible to reduce such a possibility that the operator, who installs the cartridge 30 and the pouch 100 to the printer 1, may install the pouch 100 to the printer 1 while misunderstanding the direction of the pouch 100.

The operator, who installs the cartridge 30 to the printer 1, allows the cover 22 to be in the open state so that the cartridge 30 is inserted into the accommodating unit 12 from the front position via the opening 11. When the cartridge 30 is inserted to arrive at the deep portion of the accommodating unit 12, the installing unit 8 is connected to the engaging unit 105. In this situation, the needle 9 of the installing unit 8 is arranged in the spout 107. The spout 107 of the pouch 100 is arranged on the left lower side of the cartridge 30, i.e., at the position shifted toward the left plate 34. Therefore, it is possible to reduce such a possibility that the operator may install the cartridge 30 and the pouch 100 to the printer 1 while misunderstanding the directions of the cartridge 30 and the pouch 100.

As explained above, the spout inserting portion 115 is formed at the position shifted to the left seal portion 121 from the center (C1, C2) between the left seal portion 121 and the right seal portion 122 in the left-right direction at the lower end portion of the gusset 103 in the upward-downward direction.

Accordingly, it is possible to reduce such a possibility that the operator may install the pouch 100 to the cartridge 30 while misunderstanding the direction of the pouch 100. Further, when the cartridge 30 and the pouch 100 are installed to the printer 1, the user can easily understand the correct direction of the pouch 100 upon the installation. On this account, it is possible to reduce such a possibility that the user may install the pouch 100 to the printer 1 while misunderstanding the direction of the pouch 100.

The pouch 100 is provided with the spout 107 inserted into the spout inserting portion 115. On this account, it is possible to reduce such a possibility that the cartridge 30 and the pouch 100 may be installed to the printer 1 while misunderstanding the directions of the cartridge 30 and the pouch 100, and the ink G cannot be supplied from the pouch 100 to the printer 1.

The cartridge 30 can accommodate the pouch 100. As for the cartridge 30, the user can reduce such a possibility that the pouch 100 may be accommodated in the cartridge 30 in any erroneous direction. Further, when the cartridge 30 and the pouch 100 are installed to the printer 1, it is possible to reduce such a possibility that the user may install the pouch 100 to the printer 1 while misunderstanding the direction of the pouch 100.

The printer 1 can be installed with the cartridge 30. When the cartridge 30 and the pouch 100 are installed to the printer 1, it is possible to reduce such a possibility that the user may install the pouch 100 to the printer 1 while misunderstanding the direction of the pouch 100.

In the embodiment described above, the upward-downward direction of the pouch 100 depicted in FIGS. 5 to 10 is an example of the "first direction" of the present disclosure. The left-right direction of the pouch 100 depicted in FIGS. 5 to 10 is an example of the "second direction" of the present disclosure. The front-rear direction of the pouch 100 depicted in FIGS. 5 to 10 is an example of the "third direction" of the present disclosure. The left seal portion 121 is an example of the "first edge" of the present disclosure. The right seal portion 122 is an example of the "second edge" of the present disclosure. The front gusset 113 is an example of the "gusset" of the present disclosure.

The present disclosure is not limited to the embodiment described above, which can be variously changed within a scope without deviating from the gist or essential characteristics of the present disclosure. In the embodiment described above, the pouch 100 accommodates the ink G. However, there is no limitation thereto. For example, the pouch 100 may accommodate any liquid other than the ink G. The pouch 100 may accommodate liquid for the maintenance. The liquid for the maintenance is, for example, nozzle cleaning solution (washing solution). In this case, the pouch 100, in which the nozzle cleaning solution is accommodated, is accommodated in the maintenance box. Further, it is necessary to suppress the solidification of the ink Gin the ink tube 48 which connects the cartridge 30 and the pouch 100 with respect to the head of the printer 1 during the shipping or during the long term storage of the printer 1. In this case, preserving liquid (storage liquid or shipping liquid), which is to be introduced into the ink tube 48, may be stored in the pouch 100. In this case, liquid, which is hardly volatile as its characteristic, may be adopted as the preserving liquid.

In the embodiment described above, the pouch 100 is accommodated in the cartridge 30, and the pouch 30 is installed to the printer 1 together with the cartridge 30. However, there is no limitation thereto. For example, the following configuration is also available for the printer 1. That is, the pouch 100 is not accommodated in the cartridge 30, and the pouch 100 can be installed to the printer 1 as it is. In the case of such configuration, the pouch 100 also provides the effect which is the same as or equivalent to that of the embodiment described above.

In the embodiment described above, the shape of the pouch 100 in the expanded state is the rectangular parallelepiped shape. However, there is no limitation thereto. For example, the shape of the pouch 100 in the expanded state may be either any other polyhedral shape or a cylindrical shape. Further, it is also allowable that the pouch 100 does not have the shape which is symmetrical in relation to the front-rear direction. In this case, for example, the upper portion 111 may be either longer than or shorter than the lower portion 112.

The pouch 100 is formed such that one sheet made of synthetic resin is incorporated and edge portions and the like are thermally welded. However, there is no limitation thereto. For example, a pouch may be formed by thermally welding edge portions of a plurality of sheets. For example, a pouch may be formed by four sheets, i.e., an upper sheet, a lower sheet, a right sheet, and a left sheet, a front gusset, and a rear gusset.

In the embodiment described above, the spout inserting portion 115 is provided at the position depicted in FIGS. 8 to 10, i.e., on the lower-left side of the front gusset 113 (lower edge seal portion 124). However, there is no limitation thereto. The spout inserting portion 115 may be provided at an end edge in the upward direction of the front gusset 113. In this case, the spout inserting portion 115 may be provided at the upper edge seal portion 123. The spout engaging groove 37 of the cartridge 30 may be provided at a corresponding position.

The spout inserting portion 115 may be arranged at any position provided that the position is disposed between the left seal portion 121 and the center (C1, C2) in the left-right direction. In this case, the spout connecting portion 38 of the cartridge 30 may be provided at a corresponding position.

In the embodiment described above, the spout inserting portion 115 is provided at the position which is shifted toward the side of the left seal portion 121 in the left-right direction. However, there is no limitation thereto. For example, the spout inserting portion 115 may be provided at a position shifted toward the side of the right seal portion from the center (C1, C2). In this case, the spout connecting portion 38 of the cartridge 30 may be provided at a corresponding position.

What is claimed is:

1. A pouch configured to accommodate one of ink, nozzle cleaning liquid or preserving liquid and configured to be foldable from an expanded state in which the pouch has a thickness in a first direction to a shrunk state in which the pouch has a planar shape, the pouch comprising:

a body portion provided with a first edge and a second edge in a second direction orthogonal to the first direction;

a gusset formed at an end portion of the body portion in a third direction orthogonal to the first direction and the second direction; and a spout inserting portion formed at one end edge of the gusset in the first direction, wherein the spout inserting portion is formed at a position shifted to the first edge with respect to a center between the first edge and the second edge in the second direction.

2. The pouch according to claim 1, further comprising a spout inserted into the spout inserting portion.

3. A cartridge configured to accommodate the pouch as defined in claim 1.

4. A printer to which the cartridge as defined in claim 3 is installable.

* * * * *